United States Patent [19]
Furstenau et al.

[11] Patent Number: 6,008,898
[45] Date of Patent: *Dec. 28, 1999

[54] METHOD AND APPARATUS FOR MEASURING ACCELERATION AND VIBRATION USING FREELY SUSPENDED FIBER SENSOR

[75] Inventors: Norbert Furstenau, Braunschweig; Werner Jungbluth, Konigslutter, both of Germany

[73] Assignee: Deutsche Forschungsanstalt fur Luftund Raumfart e.V., Bonn, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/637,872

[22] Filed: Apr. 25, 1996

[30] Foreign Application Priority Data

Apr. 26, 1995 [DE] Germany ............... 195 14 852

[51] Int. Cl.⁶ ........................................... G01B 9/02
[52] U.S. Cl. ................. 356/345; 356/352; 250/227.19
[58] Field of Search ................... 356/352, 345, 356/35.5; 250/227.19, 227.27

[56] References Cited

U.S. PATENT DOCUMENTS

| | | |
|---|---|---|
| 3,602,037 | 8/1971 | Neu . |
| 4,886,361 | 12/1989 | Furstenau . |
| 5,289,552 | 2/1994 | Miller et al. ..................... 356/352 |
| 5,420,688 | 5/1995 | Farah ......................... 250/227.27 |

FOREIGN PATENT DOCUMENTS

| | | |
|---|---|---|
| 0 456 681 B1 | 3/1994 | European Pat. Off. . |
| 39 39 573 A1 | 6/1991 | Germany . |
| 63-236925 | 10/1988 | Japan . |
| 2-150703 | 6/1990 | Japan . |
| 5-45566 | 6/1993 | Japan . |
| 5-44967 | 7/1993 | Japan . |

OTHER PUBLICATIONS

Quadrature phase–shifted, extrinsic Fabry–Perot optical fiber sensors, Feb. 15, 1991, vol. 16, No. 4 Optics Letters.

High–sensitivity fiber–optic accelerometer, Feb. 15, 1989, vol. 14, No. 4 Optics Letters.

*Primary Examiner*—Samuel A. Turner
*Attorney, Agent, or Firm*—Salter & Michaelson

[57] ABSTRACT

An arrangement for measuring acceleration and vibration employs a fiber-optic interferometer comprising a monomode optical fiber through which light is guided and, having exited the fiber, is then reflected back therethrough, the exit end of the fiber being capable of transverse vibrations.

20 Claims, 3 Drawing Sheets

METHOD AND APPARATUS FOR MEASURING ACCELERATION AND VIBRATION USING FREELY SUSPENDED FIBER SENSOR

BACKGROUND OF THE INVENTION

The invention relates to a method of measuring acceleration and vibration using a fibre-optic sensor and to a device or arrangement measuring acceleration and vibration having a light source, an optical fibre, a reflector and a photodetector.

Measuring methods and measuring devices of such a type are described in literature as vibration and range sensors.

In one construction, a variation in the distance between a transmitting and a receiving fibre and a reflective surface is measured by means of the corresponding variation in intensity. Here, multi-mode fibres are used as optical fibres. Although, on account of the multi-mode fibre technology used, said sensors are relatively easy to realize, because of their open design principle they may be used only in a relatively protected environment with short glass-fibre transmission links. It is not possible to realize long transmission links because of the extensive damping in the multi-mode fibre. Such sensors are sold, for example, by the company TETRA Gesellschaft für Sensorik, Robotik und Automation mbH, llmenau, Germany.

From EP 0 456 681 B1, a fibre-optic accelerometer based on a Fabry-Perot interferometer is known, in which a diaphragm deformable by acceleration is provided. Fastened in the centre of the diaphragm is a hemispherical mirror, opposite which lies the end of an optical fibre. Upon deformation of the diaphragm, the variation in the distance between fibre end and mirror is measured by interferometry according to the Fabry-Perot principle and used to calculate the acceleration. The drawback is that such a diaphragm is sensitive and costly to clamp and hold.

From DE 3 939 573 A1 a device is known, in which a clamped fibre is immersed into a flowing environment. Said flowing environment bends the end of the optical fibre out of its position of rest and hence alters the distance from a position detector which responds to light intensity. A similarly operating device is known from U.S. Pat. No. 3,602 037, in which a light-guiding rod is bent under the influence of forces, thereby reducing the dimension of the light beams which exit at its end and are picked up by a photodetector. Such constructions are however unsuitable for high-precision vibration and acceleration measurements, especially as such equipment is of a relatively large size.

SUMMARY OF THE INVENTION

The present invention seeks to provide a fibre-optical measuring method and measuring arrangement whereby, using a simply constructed and sturdy but at the same time also small sensor, accelerations and vibrations may be detected in a manner not susceptible to disturbances even via long glass-fibre transmission links.

In accordance with a first aspect, the invention provides a method of measuring acceleration and vibration using a fibre-optic sensor, light being guided through a monomode fibre and exiting at one end, said light then being reflected by a mirror back into said fibre again, wherein a first end of the monomode fibre is capable of vibration in a freely suspended manner, said vibration being in a transverse direction and said mirror having a flat surface.

In accordance with a second aspect, the invention provides an arrangement for measuring acceleration and vibration having a light source, an optical fibre having first and second ends, a reflector and a photodetector, wherein the optical fibre is a monomode fibre, the reflector is in the form of a flat mirror and is disposed closely opposite the first end of the fibre and the first end of the monomode fibre forms a sensor fibre portion, said portion projecting with a defined length freely beyond a fixed clamp and being capable of transverse vibration.

BRIEF DESCRIPTION OF THE DRAWINGS

Preferred embodiments of the present invention will now be described, by way of example only, with reference to the accompanying drawings, of which.

DESCRIPTION OF THE INVENTION EMBODIMENTS

Figure 1:
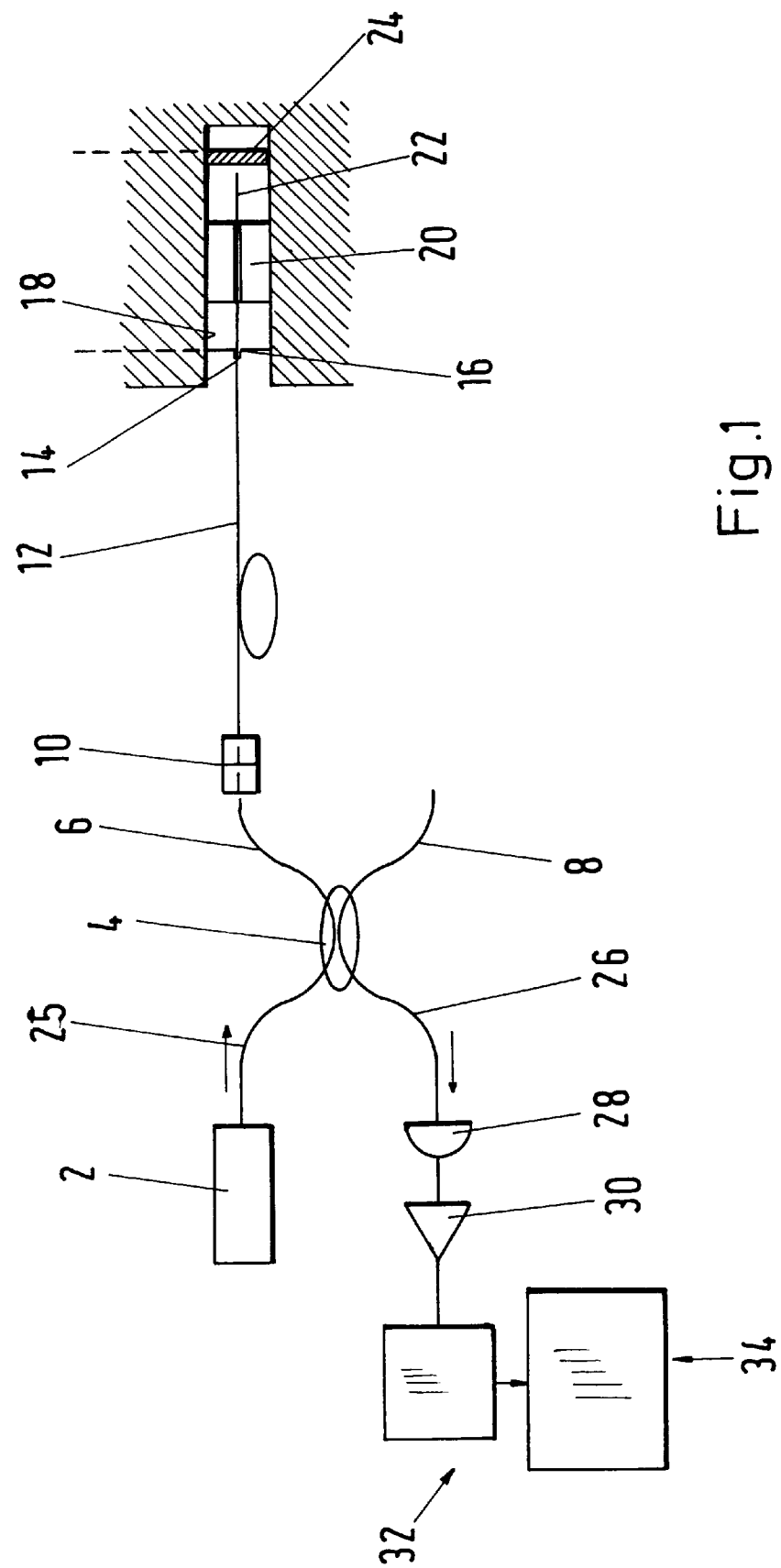
FIG. 1 diagrammatically shows the construction of a measuring arrangement according to the invention.

Basically, the invention provides a device in which the end of the monomode fibre may vibrate in a freely suspended manner, said vibration is transversal and the mirror has a flat surface.

The invention also provides a device in which the optical fibre is a monomode fibre, the reflector in the form of a flat mirror is disposed closely opposite the end of the fibre and the end of the monomode fibre forms a sensor fibre portion, which projects with a defined length (l) freely beyond a fixed clamp and may vibrate transversally.

With acquisition of the phase variation of a light beam reflected back into a monomode fibre a fibre-optical interferometer is realized which, because of its optical measuring principle, may be read out via long glass-fibre links. Consequently, the electrical components of the measuring arrangement may be disposed far away from the measuring location. Disturbances at the measuring location, such as high temperatures, aggressive ambient media or electromagnetic interference, cannot influence the electrical components. The measuring method, because of the possibility of direct measurement of the phase variation, is in principle extensively independent of and unaffected by fluctuations in intensity. The construction of the sensor may be realized in the form of a micro-interferometer as a fibre-optical, extrinsic Fabry-Perot interferometer in miniaturized form. Advantageously, only a monomode fibre has to be run from the electrical components to the measuring location. The installation cost is therefore low. The sensor may therefore be used in many fields ranging from medicine to structural monitoring, e.g. of vibrations in buildings, roads or bridges, and machine monitoring.

With a long monomode fibre link, evaluation of the measuring signal may be carried out far away from the measuring location. Furthermore, the sensor may be used at different measuring locations without the electrical components having to be moved.

From the phase variation in the measuring signal which is easy to acquire, e.g. by means of the variation in intensity of the interference signal, the deflection of the free end of the monomode fibre may be determined. The deflection is in turn a measure of the acceleration acting upon the free end of the monomode fibre, with the result that the acceleration may be determined from the acquired phase variation.

The total phase of the measuring signal is preferably determined by adding the acquired phase variation to an initial phase. The initial phase takes into account the geometry of the sensor and, for example, the statically occurring deflection of the free end of the monomode fibre as a result of gravitational acceleration if the sensor is installed horizontally. The total phase of the measuring signal is preferably determined by adding the acquired phase variation to an initial phase.

For example, for analysis of vibration spectra, the intensity fluctuation recorded at a photodiode corresponding to the interference signal produced in the sensor may after analogue-to-digital conversion be converted by means of a fast Fourier transform (FFT) into the frequency range and then evaluated.

The measuring arrangement is preferably so constructed that the end of the monomode fibre forms a sensor fibre portion which projects with a defined length freely beyond a fixed clamp. The portion of the fibre projecting freely beyond the fixed clamp forms the actual sensor which is deflected by accelerations or set vibrating by vibrations.

The reflector in the form of a flat mirror lies opposite the end of the sensor fibre portion formed by a smooth-surfaced flat cut. The entire arrangement therefore constitutes an interferometer.

The above-mentioned transversal vibrations are something which, for example, the prior art according to EP 0 456 681 B1 could not take into account.

With the spherical mirrors which it was previously necessary to use for Fabry-Perot interferometers, a transversal vibration of a clamped fibre end would, if anything, only be able to develop an extremely non-linear signal effect. The use of two flat mirrors in the present context is totally new and unexpected and was previously not customary because two flat mirrors produce an unstable Fabry-Perot resonator. But it is precisely the slight variations in distance which arise between the end of the fibre and the flat mirror surface during vibration which enable the high-precision measurement.

The characteristic of said measurement is substantially linear, in view of the only small deflections of the fibre it is possible by suitable adjustment to achieve the effect that always one edge of the interference signal is utilized, which leads to a particularly precise resolution.

It is moreover particularly preferred if the axis of the fibre is not exactly perpendicular to the surface of the flat mirror but is tilted or inclined slightly relative thereto. In said case, namely, upon a vibration of said fibre the distance from fibre end to mirror will be primarily linear rather than oscillating about a zero point position, as would be the case given a precisely perpendicular alignment with the surface.

The same effect may alternatively be achieved by cleaving the fibre end obliquely or positioning the flat mirror with its surface normal slightly tilted relative to the sensor axis.

Said effect is achieved in a particularly preferred manner in that the flat mirror surface in the finished construction is positioned vertically, i.e. the fibre axis is therefore aligned substantially horizontally. On account of gravity, the end of said fibre is then deflected slightly downwards, which leads precisely to the desired eccentric effect. All of said effects are extremely small, which however fits in very well with the desired miniaturization of the entire construction.

In said connection, it is also particularly preferred if the distance from fibre end to mirror lies in the region of between 5 and 30 μm.

By virtue of the fact that the sensor fibre portion together with the reflector is disposed in a sensor housing, a compact and sturdy sensor is provided, in which the freely suspended sensor fibre portion and the reflector are housed in a defined arrangement relative to one another. The "housing" may be produced in the form of nested capillary fibres made, like the sensor fibres, of silica glass. The sensor housing may be handled without difficulty without any need to readjust the sensor fibre portion or the reflector.

By virtue of the fact that the reflector is a short reflector fibre which is held in a clamp in such a way that the end face of the reflector fibre lies closely opposite the end face of the sensor fibre, a particularly compact and thermally compensated sensor may be realized. The reflector fibre firmly clamped as a reflector is preferably similar to the sensor fibre portion so that the thermomechanical properties of the sensor are optimized.

In order to supply the phase-modulated measuring signal of the sensor to the photodetector, a directional coupler is preferably provided between the light source and the monomode fibre.

When the light source takes the form of a high-capacity infrared diode, preferably a superluminescent diode, a particularly high light output of a defined wavelength is fed into the measuring arrangement. Such light-emitting diodes typically emit light having a wavelength of 830 nm, 1300 nm or 1500 nm, the spectral width being only around 10 to 60 nm. An arrangement of an extrinsic Fabry-Perot interferometer with two opposite-lying fibre ends for a quite different purpose is known from Kent A. Murphy et al., "Quadrature Phase Shifted Extrinsic Fabry-Perot Optic Fibre Sensors", OPTICS LETTERS, Volume 16 (1991), pages 273–275. This relates however, not to acceleration and vibration measurements, but to an extension sensor. The two fibre ends lying opposite one another are again provided as an incoming line and a reflector and are in each case fixed on the sample, which is to be measured for its extension behaviour, and aligned with their end faces parallel to one another by means of a capillary tube. The absolute distance variation of the two fibre ends relative to one another is a measure of the extension of the sample. Since the two fibre ends are supported in the capillary tube so as to be slidable relative to one another, the distance is accordingly convertible.

In contrast to the above, in the present invention a vibration measurement is possible because, for the first time, the transversal vibration of the incoming fibre end is utilized. The associated small variation in the distance between fibre end and reflector is verifiable by interferometry. Here however, unlike the known extrinsic Fabry-Perot interferometers, there are usually no multiple interference fringes to be observed. Instead, the intensity variations of one interference fringe, which correspond to the phase variations of the reflected light wave, are to be evaluated. For said purpose, a good intrinsic thermal compensation of the sensor is useful, this being guaranteed in particular by the proposed miniaturized construction variant.

The invention therefore makes it possible also to use a light source with a low coherence length adapted to the interferometer dimensions. This avoids the disturbing interferences which arise as a result of insufficiently suppressed reflexes at glass-air interfaces in the optical system and which otherwise, in interferometry sensors with injection laser diode light sources, may be minimized only with a substantial outlay.

According to the invention, it is preferred if the sensor takes the form of a Fabry-Perot interferometer. It could however alternatively take the form of, for example, a Michelson interferometer.

Referring now to the drawings, FIG. 1 diagrammatically illustrates the construction of a fibre-optic acceleration and vibration sensor according to the invention. The measuring arrangement comprises a light-emitting diode 2 as a light source. Said light source preferably takes the form of a superluminescent diode (SLD) which emits light in the infrared region with wavelengths of typically 830 nm, 1300 nm or 1500 nm. The light-emitting diode 2 has a glass-fibre attachment, to which a first input arm 25 of a fibre-optic directional coupler 4 is connected in a suitable manner, e.g. by a splice. A monomode fibre 12 is connected to one of the two outputs 6, 8 of the fibre-optic directional coupler 4 by a monomode connector 10. The installed monomode fibre 12 guides the light to the actual sensor of the measuring arrangement. The monomode fibre 12 may be of a considerable length, e.g. several kilometres, so that the electrical components may be disposed far away from the actual measuring location. A sensor housing 18 is connected by a monomode connector 14 to the end of the monomode fibre 12 remote from the light source 2. The sensor housing 18 has a suitable adaptor 16 for connection of the monomode connector 14 of the monomode fibre 12.

The sensor housing 18 is preferably cylindrical, a sensor fibre portion 22 being disposed along the centre line of the cylindrical housing 18. The sensor fibre portion 22 is connected at the adaptor 16 by connector 14 to the monomode fibre 12. The sensor fibre portion 22 is firmly anchored in the housing 18 by means of a clamp 20. Provided at the opposite end of the sensor fibre portion 22 to the monomode fibre connection is an end face, which is cut orthogonally or slightly obliquely (<5°) relative to the fibre axis. Said end of the sensor fibre portion 22 projects with a defined length I freely beyond the fixed clamp 20. Said fibre portion and, if need be, the fibre portion held in the clamp 20 may be stripped of insulation.

The freely suspended sensor fibre portion 22 is disposed with its end face closely adjacent to a mirror 24. The end face of the sensor fibre portion 22 which is cut orthogonally or slightly obliquely relative to the fibre axis is aligned virtually parallel to the mirror surface. The air gap formed between said two interfaces (which, if need be, may be evacuated or filled with a different gas) produces an interference signal upon reflection of the light beam which is emitted by the light-emitting diode 2 and supplied by means of the monomode fibre 12.

The freely suspended sensor fibre portion 22 therefore forms the acceleration-and vibration-sensitive sensor element. Accelerations and vibrations are detected by deflections at the portion of the sensor fibre 22 which projects beyond the clamp 20, the size of the air gap, i.e. of the distance between the end face of the sensor fibre portion 22 and the mirror 24, altering.

The interference signal produced as a result of the deflections is supplied via the monomode fibre 12 to the directional coupler 4. Connected to the second input arm 26 of the directional coupler 4 is a photodetector in the form of a photodiode 28. There, the interference signal produced at the sensor is converted into an electrical signal.

Connected to the electrical output of the photodiode 28 is a pre-amplifier 30. The output of the pre-amplifier 30 is connected to an electronic evaluator 32. The electronic evaluator 32 preferably comprises an analogue-to-digital converter which digitizes the analogue electrical measuring signal. The vibration frequency spectrum picked up by the sensor may then be analyzed, e.g. by a spectrum analyzer 34, for example by means of a fast Fourier transform.

Figure 2:
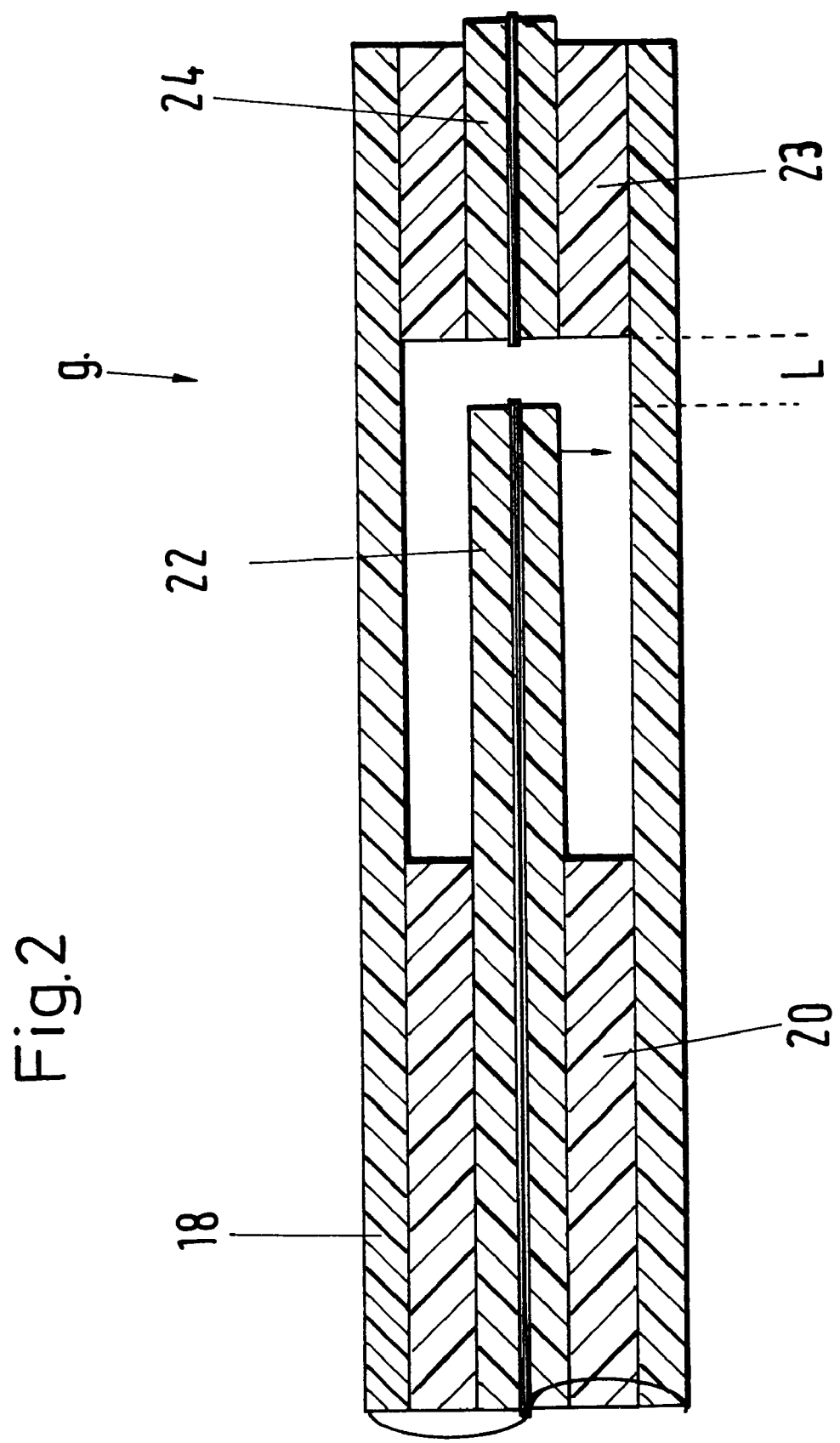
FIG. 2 diagrammatically shows the construction of an acceleration and vibration sensor.

FIG. 2 shows in cross section the basic construction of an acceleration and vibration sensor according to a second form of construction. The housing 18 comprises a cylindrical outer capillary fibre into which, from the one end face, the sensor fibre 22 projects. The sensor fibre 22 is fixed by means of the clamp 20 in the housing 18. The clamp 20 comprises an inner capillary fibre 20, which is tightly inserted into the outer capillary fibre 18 of the housing. The sensor fibre 22 is tightly inserted into the bore of the inner capillary fibre 20. The end of the sensor fibre 22 has an end face, which is cleaved orthogonally or slightly obliquely (<5°) relative to the fibre axis and projects by a defined length I freely beyond the fixed clamp 20 in the inner capillary fibre 20. At the other end of the housing 18 in the form of an outer capillary fibre, a short glass-fibre portion is fixed as a reflector fibre 24 in a clamp 23 in the form of an inner capillary fibre. The opposite end of the reflector fibre 24 to the end face of the sensor fibre 22 likewise takes the form of an orthogonally or slightly obliquely cleaved end face. Formed between the two opposing end faces of the sensor fibre 22 and the reflector fibre 24, which are cut from the same monomode fibre material, is an air gap L measuring a few to several tens of $\mu$m. To increase the interference signal amplitude, the two opposing end faces may be coated with dielectric quarter-wave layers. To simplify construction, the reflector element may alternatively take the form of a small glass rod with an outside diameter corresponding to the inside diameter of the outer capillary tube, thereby dispensing with the inner capillary tube 23 of the reflector fibre 24. The second embodiment helps to achieve further miniaturization of the sensor since the reflector also takes the form of a fibre portion with a correspondingly small diameter. The two opposing fibre portions are aligned precisely relative to one another on account of the clamps 20, 23 taking the form of precision capillary fibres. In terms of its dimensions, such a sensor is therefore only of the order of a millimetre in diameter and a few centimetres in length.

There follows a description of the measuring process and the measurement evaluation.

From the light source 2 of the sensor system, a light beam of adequate coherence length and light output is transmitted via the fibre-optic directional coupler 4 into the installed monomode fibre 12 leading to the actual sensor element. 50% of the light intensity-modulated by the measured quantity and fed back by the sensor element into the monomode incoming fibre 12 is branched off in the 3 dB directional coupler 4 into the second input arm 26 of the coupler 4. At the second input arm 26 of the coupler 4, the photodiode 28 receives the interference signal and converts it into an electrical signal. The analogue electrical signal of the photodiode 28 is then converted into a digital signal for further measurement analysis. The digital data may then be analyzed, for example by means of fast Fourier transform, in terms of the vibration frequencies.

The actual sensor element is a fibre-optic micro-interferometer, in which an acceleration and vibration sensor is designed in such a way that transversal motions or bending vibrations of the glass-fibre portion designed as a freely vibrating sensor are possible. The spring-mass system is a clamped glass-fibre end which is typically one to a few centimetres in length and which, depending on whether damping is required, is stripped of insulation. The system reacts like a cantilever beam constrained at one end. The preferably bare glass-fibre portion is the end of the sensor fibre portion 22 which is fixed by the clamp 20 in a strain-relieving manner on the thermally stable housing 18. The other end of the sensor fibre portion 22 is connected to the incoming cable 12 in the form of a monomode fibre. Disposed opposite the fibre end at a fixed distance L is the reflector 24 which is adjustably or firmly inserted in the housing. The gap between the end face of the freely vibrating fibre portion 22 and the reflector 24 is a Fabry-Perot micro-interferometer. Upon a variation in the distance between fibre end face and reflector, the Airy function is recorded as the interference signal characteristic of Fabry-Perot interferometers.

The superluminescent diode (SLD) 2 serving as a light source has, besides a high output intensity, a much lower coherence length than an injection laser diode. A high-quality SLD is notable for a Gaussian spectrum, e.g. with a central wavelength of 830 nm and a spectral width $\delta\lambda$ typically of 15 nm, which corresponds to a coherence length of 50 to 15 $\mu$m. Given the Fabry-Perot resonator length of L=a few to tens of $\mu$m, this on the one hand guarantees a good interference contrast and on the other hand simultaneously avoids the disturbing interferences, which arise because of insufficiently suppressed reflections at the glass-air interfaces in the optical system and which otherwise, in interferometry sensors, may be minimized only with a considerable outlay.

The output signal crucial to operation of the sensor arises in the sensor element as a result of the variation in the distance between the centre of the flat end face of the sensor fibre portion 22 and the opposite-lying reflector 24 caused by a deflection of the free sensor fibre portion 22 produced by a transverse acceleration, such as is indicated by arrow g in FIG. 2 . Because of the rotational symmetry of the sensor element around the fibre longitudinal axis (x-axis), the sensor measures the value of the acceleration component in the plane at right angles thereto (y-z direction). If the fibre longitudinal axis (x-axis) of the sensor points initially in a vertical direction, i.e. parallel to the vector of gravitational acceleration, and the sensor is then moved into the horizontal position, then the propped cantilever fibre portion bends as a result of the surface load q (force per fibre length) produced as a result of the gravitational acceleration g:

$$q = F_g/l = \rho\pi R^2 g, \qquad (1)$$

where Fg=force (due to weight), l=length of the freely vibrating fibre portion, $\rho$=density of the fibre material (silica glass), R=fibre radius.

From this, the elementary theory of elasticity produces for the deflection of the fibre end out of the position of rest:

$$w_g = \frac{ql^4}{8EJ} = \frac{\rho l^4}{2ER^2} g, \qquad (2)$$

where $J=\pi R^4/4$ the planar moment of inertia of the glass-fibre cross section, l=the length of the free fibre end and E=the modulus of elasticity of silica glass.

For the angle $\Theta$ of the tangent of the deflected fibre end to the sensor axis per unit of gravitational acceleration, the following applies:

$$\Theta_g = 4w_g/(3l), \qquad (3)$$

corresponding to 0.0014 rad for l=30 mm.

The optical path variation for the light beam between fibre end and mirror effected as a result of bending of the fibre under its own weight is then calculated for small deflections per unit of gravitational acceleration approximately as follows:

$$\Delta L_g \approx w_g \Theta_g = 3/4 l\Theta_g^2 \qquad (4)$$

Since w and $\Theta$ vary to the power of four and three of the length of the free fibre end, the measuring effect ($\Delta L$) is drastically influenced by slight variations in the length l of the free fibre end. Given vibrations with transverse accelerations occasionally far greater than 1 g, correspondingly greater distance variations arise.

The intensity losses, which arise in the measuring arrangement at the light beam guided to the photodiode 28 as a result of the Fabry-Perot maladjustment associated with bending of the sensor fibre, only have a slight influence upon the interference output signal, which is crucial to operation as a highly sensitive acceleration and vibration sensor, and in particular upon the interference contrast. Thus, the distance variations $\Delta L$ caused by small deflections w or $\Theta$ may be calculated directly from the phase variation $\Delta\Phi$ using the following formula:

$$\Delta\Phi = 2\pi 2\Delta L/\lambda \approx 3\Theta^2 l/\lambda. \qquad (5)$$

The phase variation (5) is converted by means of the interference signal (=reflected intensity $i_r = I_r/I_o$; $I_o$=input intensity);

$$i_r = 2R(1-\exp\{-\phi_o \delta\lambda/\lambda\}\cos\phi) \qquad (6)$$

into an intensity variation which may be electronically evaluated using known methods. (6) is valid for low mirror reflectivity R. $\delta\lambda$ is the spectral width of the light source.

For the total phase $\Phi = \Phi_o + \Delta\Phi$, it is necessary additionally to take into account the initial phase $\Phi_o = 4\pi L_{FP}/\lambda$ because of the initial distance L between fibre end face and reflector. With the adjustment of the initial distance L and the initial deflections $w_o$ ($w_o$=w(g), g=9.81 m/s$^2$), the working point of the micro-interferometer is adjustable within a broad range, so that the required sensitivity for the sensor is adjustable.

Figure 3:
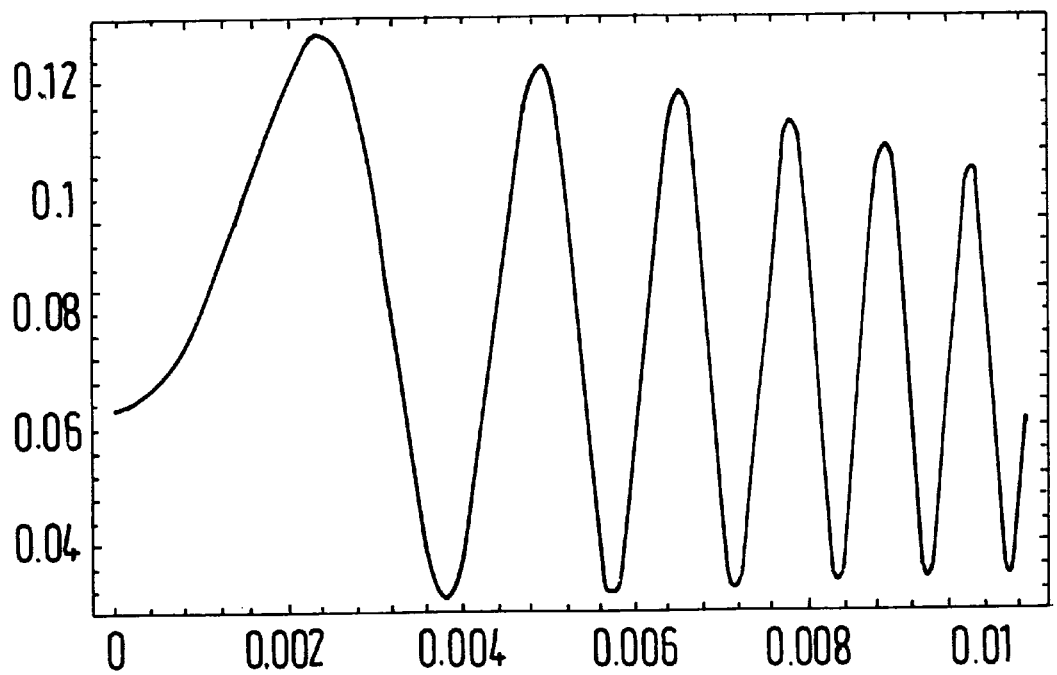
FIG. 3 shows a representation of an example of an occurring interference signal.

FIG. 3 shows the numeric evaluation of equation (6) for R=4%, wavelength =830 nm, spectral width $\lambda\delta$=20 nm, length of the sensor fibre portion l=30 mm, taking into account the losses which are caused by the mirror distance and which reduce the effective reflectivity of the flat mirror at the distance L=5 $\mu$m (from the end of the sensor fibre portion 22). The angle $\Theta$ in rad is plotted on the X-axis, the intensity (normalized) is plotted on the Y-axis. The working point on account of the initial deflection caused by the fibre weight lies, in the present example, at $\Theta$=0.0014 rad and hence on the rising edge of the first interference fringe.

If, in the event of greater transverse accelerations, the deflections of the free sensor fibre portion 22 become so great that the output signal moves into the non-linear region of the sin$^2\phi$ interferometer characteristic, the sensor fibre portion may be shortened to reduce the vibration amplitudes. On the other hand, by lengthening the sensor fibre portion, the optical path variations corresponding to the vibration amplitudes may be set so high that a greater number of interference fringes are covered in the output signal.

Thus, on the whole, a miniaturized, optically operating acceleration and vibration sensor is indicated, which may easily be integrated into building structures and machines. Because the sensor element may be separated by means of long glass-fibre links from the electrical components, influencing of the measurement result by disturbances at the measuring location, such as electromagnetic interference, may be avoided.

It will be understood that the above description of the present invention is susceptible to various modifications, changes and adaptations.

LIST OF REFERENCE NUMERALS 2 light source, light-emitting diode
4 directional coupler
6 output
8 output
10 monomode connector
12 monomode fibre
14 monomode connector
16 adaptor
18 housing
20 clamp
22 sensor fibre portion
24 reflector
25 first input arm
26 secondinputarm
28 photodetector, photodiode
30 pre-amplifier
32 electronic evaluator

What is claimed is:

1. A method of measuring acceleration and vibration using a fiber-optic sensor, light being guided through a monomode fiber and exiting at a first end of said fiber into an air gap, said light then being reflected by a mirror back through said air gap into said fiber again, wherein said monomode fiber is clamped at a distance from said first end, so as to enable said first end to vibrate transversely in a freely suspended manner, and said mirror has a flat surface and is fixed within a sensor housing.

2. A method according to claim 1, wherein said sensor takes the form of a Fabry-Perot micro-interferometer.

3. A method according to claim 1, wherein said vibration has a low vibration evaluation characteristic presenting a substantially linear dependence of the interferometer phase upon the vibration amplitude.

4. A method according to claim 3, wherein the freely suspended, transversally vibrating first end of the monomode fibre has a central position, said central position being tilted slightly out of the perpendicular relative to the plane of the flat mirror.

5. A method according to claim 1, wherein from the acquired phase variation ($\Delta\Phi$, in radians) the deflection (w) of the free end of the monomode fibre is determined using the following formula for small deflections:

$$\Delta\Phi \approx \frac{16}{3}\pi\frac{w^2}{\lambda \cdot l},$$

where l is the length of the freely vibrating fibre portion and $\lambda$ is the wavelength of the used light.

6. A method according to claim 1, wherein from the deflection (w) the acceleration (a) is determined using the following formula:

$$a = \frac{2ER^2}{\rho l^4}w$$

where E is the modulus of elasticity of the monomode fibre,
R is the fibre radius and
$\rho$ is the density of the fibre material.

7. A method according to claim 1, wherein the total phase ($\Phi$) of the measuring signal is determined by adding the acquired phase variation ($\Delta\Phi$) to an initial phase ($\Phi_o$) according to the following formula:

$$\Phi = \Phi_o + \Delta\Phi = 4\pi L_{FP}/\lambda + \Delta\Phi$$

where $L_{FP}$ is the initial distance between the first end of the fibre and the mirror and
$\lambda$ is the wavelength of the light.

8. A method according to claim 1, wherein the vibration signal is subjected to spectral analysis in order to classify the vibration frequency spectrum.

9. An arrangement for measuring vibration and acceleration, the arrangement including a light source, an optical fiber having first and second ends, a reflector, an air gap between said first end of said optical fiber and said reflector, and a photodetector, wherein the optical fiber is a monomode fiber, the reflector is in the form of a flat mirror which is disposed closely opposite the first end of the fiber and fixed within a housing of the arrangement, and the first end of the monomode fiber forms a sensor fiber portion, said portion projecting with a defined length freely beyond a fixed clamp so as to enable the portion to vibrate transversely.

10. An arrangement according to claim 9, wherein, upon deflection of the first end of the fibre, there is caused through the phase variation an intensity variation in the measuring signal.

11. An arrangement according to claim 9, wherein said sensor fibre portion and said reflector are disposed in said sensor housing, said sensor housing being made of INVAR steel.

12. An arrangement according to claim 9, wherein said reflector is a short reflector fibre held in a clamp in such a way that an end face of the reflector fibre lies closely opposite the first end of said monomode fibre.

13. An arrangement according to claim 9, wherein a directional coupler is provided between said light source and said monomode fibre in order to supply a phase-modulated interference signal as an intensity variation to the photodetector.

14. An arrangement according to claim 9, wherein said sensor takes the form of a Fabry-Perot micro-interferometer.

15. An arrangement according to claim 9, wherein the distance between the reflector and the first end of the fibre is between 5 and 30 $\mu$m.

16. An arrangement according claim 9, wherein silica glass precision capillary tubes are used to clamp the monomode fibre and/or as a housing.

17. An arrangement according to claim 9, wherein the first end of the monomode fibre is tilted out of the perpendicular to the plane of the flat reflector or the reflector is positioned obliquely relative to the sensor axis, in each case with a deviation of the surface normal from the sensor axis of less than 5°.

18. An arrangement according to claim 17, wherein the plane of the reflector during the built-up measurement is vertical and the end of the sensor fibre portion extends substantially horizontally so that, under the influence of gravity, the first end of the monomode fibre is bent down slightly out of the horizontal.

19. An arrangement according to claim 9, wherein the first end of the monomode fibre is cleaved obliquely with a deviation of the surface normal from the axis of the sensor of less than 5°.

20. An apparatus for measuring vibration and acceleration comprising:
a housing;

a clamp disposed within said housing;

an optical fiber having a portion thereof mounted in said clamp, said optical fiber having a first end and a second end;

a light source disposed at said second end of said monomode fiber;

a reflector fixed within said housing, said reflector being spaced from said first end of said optical fiber; and an air gap disposed between said first end of said optical fiber and said reflector;

wherein said first end of said optical fiber comprises a sensor, said sensor projecting with a defined length beyond said clamp toward said reflector, so as to enable said sensor to vibrate transversely.

* * * * *